Patented Sept. 6, 1927.

1,641,874

UNITED STATES PATENT OFFICE.

CYRUS S. WERT, OF KENDALLVILLE, INDIANA.

METHOD OF APPLYING CEMENT HARDENER AND WATERPROOFING TO THE MAIN BODY AND FACE OF A CONCRETE BRICK.

No Drawing.   Application filed July 17, 1923.   Serial No. 652,179.

This invention relates to a novel process for making cement products such as cement brick, floor tile, concrete blocks, concrete cement sidewalks, and concrete lawn and garden furniture whereby they will have maximum hardness and will be thoroughly waterproof.

To that end, the invention contemplates a process or method involving a series of simple, practical steps for treating concrete articles with a waterproofing compound in a novel way whereby the resulting products will have at least 40% greater strength, thereby increasing the load carrying capacity, life, and durability thereof.

Building boards of the different States require that cement products stand a tensile strength of 1,500 pounds to the square inch, and if it is found that bricks are used which do not respond to an average compression test of 1,500 pounds they will be rejected and cannot be used for building purposes. Therefore, it is important that the bricks be of maximum hardness in order to be useful and pass the required tests, and furthermore, it is desirable that the bricks be made in such a way that their exposed surfaces may be easily ornamented to provide surfaces of different type.

The present method or process may be carried out in connection with any convenient and available type of apparatus according to the type of product to be made. If cement bricks are to be manufactured a cement brick making machine of the type shown in my former Patent No. 1,443,299 dated, Jan. 23, 1923, for example, may be used. However, it will, of course, be understood that the invention is not limited to its use in connection with cement bricks or like building elements, as previously indicated.

In carrying the process into effect, I propose to use two-thirds good clear sharp sand and one-third crushed rock or stone to be dry mixed with a good grade of Portland cement in the proportion three to one.

After the aggregate material is thoroughly mixed in its dry form, I propose to wet the same with water containing properly proportioned quantities of silicate of soda, potash, carbonate of lime and sulphuric acid. The aggregate material is mixed with the water containing the above chemicals until the same may be said to be in a semi-wet state, that is, to a dough-like consistency, in which it may be readily handled with a shovel or the like to be placed in the molds of a brick forming machine or the like, for forming the desired shapes.

After the material is mixed in its semi-wet form and placed in the mold it is tamped or pressed into shape and in case it is desired to make a brick for the inside portion of a wall it may then be used as it is. However, if an outside or face brick is desired, I propose to provide an ornamental outside finish by the following operations.

First, I take my trowel or float and agitate or rub the top of the finished brick until I draw to the surface thereof a sufficient amount of the liquid constituent of the brick, that is, the cement hardener and waterproofing liquid, so that I have a sloppy or slurry top coating or dressing.

Second, I place upon this moist top dressing a fine coat of cement and coloring matter, by sifting the same on through a fine sieve.

Third, I then rub and float the coat of cement and coloring matter into the dressing until the surfacing material and the main body of the brick are thoroughly bonded together by the cement hardener and waterproofing compound drawn from the body of the brick by the trowel or floating operation. If, however, sufficient moisture cannot be developed in that way, I may add additional water, continuing the chemicals previously referred to, in the form of a fine spray. However, sufficient moisture can usually be worked up from the body of the brick to provide the ornamental surfacing, thereby insuring homogeneity for the facing and the body of the brick.

Fourth, I then form the surface of the brick with the desired ornamental finish. For example, while the surface is still in plastic form, I may take a steel trowel and form the brick in a marble design; or I may take a wooden float and produce a stippled design. On the other hand, I may take a comb (wooden or rubber) and provide a comb cut brick or I can take a wire comb and provide a wire cut facing. Further than that, with different designs of brushes I may make other fancy designs such as stippled and ornamental tapestry.

It will, of course, be understood that in making a cement brick the face as well as an end may be finished so as to provide bricks for turning corners while the remaining faces of the brick may be left in their natural state.

If desired, before removing the finished bricks from the mold they may be sprayed with additional chemically treated water so as to insure absorption to the point of saturation with the waterproofing and hardening compound.

The distinctive features of the present process resides in treating the aggregate material which forms the main body of the brick with water including hardening and waterproofing chemicals, and subsequently placing the semi-wet material in a mold and working up the moisture from the main body of the brick to the surface thereof so as to permit of the surfacing or facing material and coloring matter to be placed on the brick while it is still wet and thus form a thoroughly homogeneous structure.

The coloring material used is preferably a powdered dye of the desired color, and readily purchasable on the market. And, by using different colors in dyes, very pleasing effects may be obtained.

I have found by actual test of my product of brick, wherein I have used or applied my herein described process I have added 40% of strength to the concrete brick, which meets the requirements asked by State building boards. My brick also meets the requirements as to the water absorption by the use of the above concrete cement hardener and waterproofing.

Referring to the test made on four of my bricks at the Monroe L. Patsig Laboratories, Des Moines, Iowa, by R. G. King, note as follows:

*Absorption test for 48 hours.*

| Number. | Per cent. |
|---|---|
| 1 red | 7.1 |
| 2 red | 6.7 |
| 3 yellow | 7.6 |
| 4 dark blue | 8.3 |

The standard is that none shall go over 10 per cent.

On the compression test note as follows:

*32 square inches compression surface.*

| Number. | Gross. | Lbs. per sq. in. |
|---|---|---|
| 1 red | 67,500 | 2,109 |
| 2 red | 92,000 | 2,875 |
| 3 yellow | 59,000 | 1,844 |
| 4 dark blue | 45,000 | 1,406 |

The standard of cement brick for buildings is that the average be 1,500 pounds and none shall go under 1,000 pounds. From the above results it can be seen that these bricks came well within the requirements of cement brick for building purposes.

From the foregoing it will be apparent that my present method aims to provide a process for making a hardened water-proof brick in which not only the face of the brick is made hard and water-proof, but the entire body is also made hard and water-proof.

I claim:—

1. A process for making hard and waterproof cement blocks and the like which consists in mixing a dry aggregate of sand and Portland cement, then mixing the aggregate to a semi-wet state by thoroughly commingling therewith water containing hardening and water-proofing chemicals, subsequently placing the semi-wet material in a mold and working up moisture from the main body of the block to the surface thereof, and then placing on said moisture surface of the block a surface layer of facing material and coloring matter thereby to form a homogeneous body and facing structure.

2. A process for making cement blocks and the like, which consists in making the aggregate material of Portland cement and sand in a semi-wet state by the addition of water containing hardening and waterproofing chemicals, next working up moisture from the body of the block to the surface thereof by applying tamping pressure to the surface of the block, and subsequently applying a facing coat of cement and coloring matter to the moistened surface of the block, thereby to unite the surface and the body of the block and finally finishing the block by trowelling, floating, or combing the surface thereof.

3. A process for making cement bricks which consists in treating the aggregate material with water including hardening and water-proofing chemicals, placing the semi-wet material in the mold, next working up the moisture from the main body of the brick in the mold to the surface thereof to provide a slurry top coating, then applying a coating of cement and coloring matter to form the facing for the brick, adding additional water containing hardening chemicals to said facing to insure thorough absorption and homogeneity between the facing and the body of the brick, and subsequently finishing the face of the brick by troweling, floating or combing.

In testimony whereof I hereunto affix my signature.

CYRUS S. WERT.